April 15, 1924.

G. DAVIDSON

STEERING HITCH

Filed July 21, 1923

Inventor
Gifford Davidson
Watson E. Coleman
Attorney

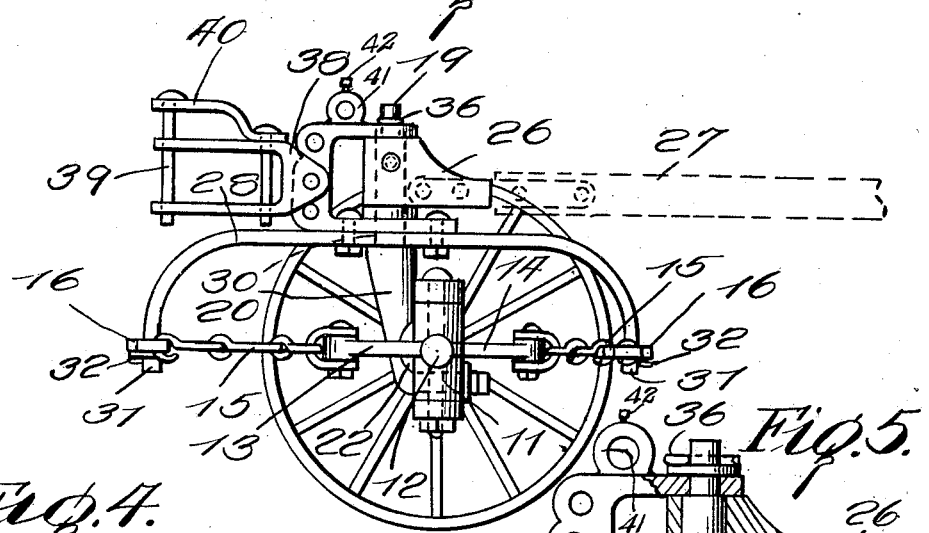

Patented Apr. 15, 1924.

1,490,768

UNITED STATES PATENT OFFICE.

GIFFORD DAVIDSON, OF FINGER, TENNESSEE.

STEERING HITCH.

Application filed July 21, 1923. Serial No. 653,013.

*To all whom it may concern:*

Be it known that I, GIFFORD DAVIDSON, a citizen of the United States, residing at Finger, in the county of McNairy and State of Tennessee, have invented certain new and useful Improvements in Steering Hitches, of which the following is a specification, reference being had to the accompanying drawings.

This invention relates to steering hitches and more particularly to a means for connecting an agricultural implement with a draft.

An important object of the invention is to provide a hitch of this character embodying a truck having dirigible wheels and means operated by a turning movement of the draft for shifting the dirigible wheels to steer the truck and accordingly the agricultural implement to which it is attached.

A further object of the invention is to provide a connection between the truck proper and the beam of the agricultural implement permitting a considerable deviation of angle of the plane between the body of the truck and the body of the agricultural implement, thus providing a device which will operate smoothly upon rough ground.

A further object of the invention is to provide a device of this character which is very simple in its construction and arrangement, which may be readily applied to the agricultural implement and which will be durable and efficient in service.

These and other objects I attain by the construction shown in the accompanying drawings, wherein for the purpose of illustration is shown a preferred embodiment of my invention and wherein:—

Figure 3 is a side elevation thereof;

Figure 4 is a fragmentary rear elevation showing the operation upon transverse inclination of the axle in dotted lines;

Figure 5 is a sectional view taken through the support and its associated parts; and Figure 6 is a perspective view of the support.

Figure 1:
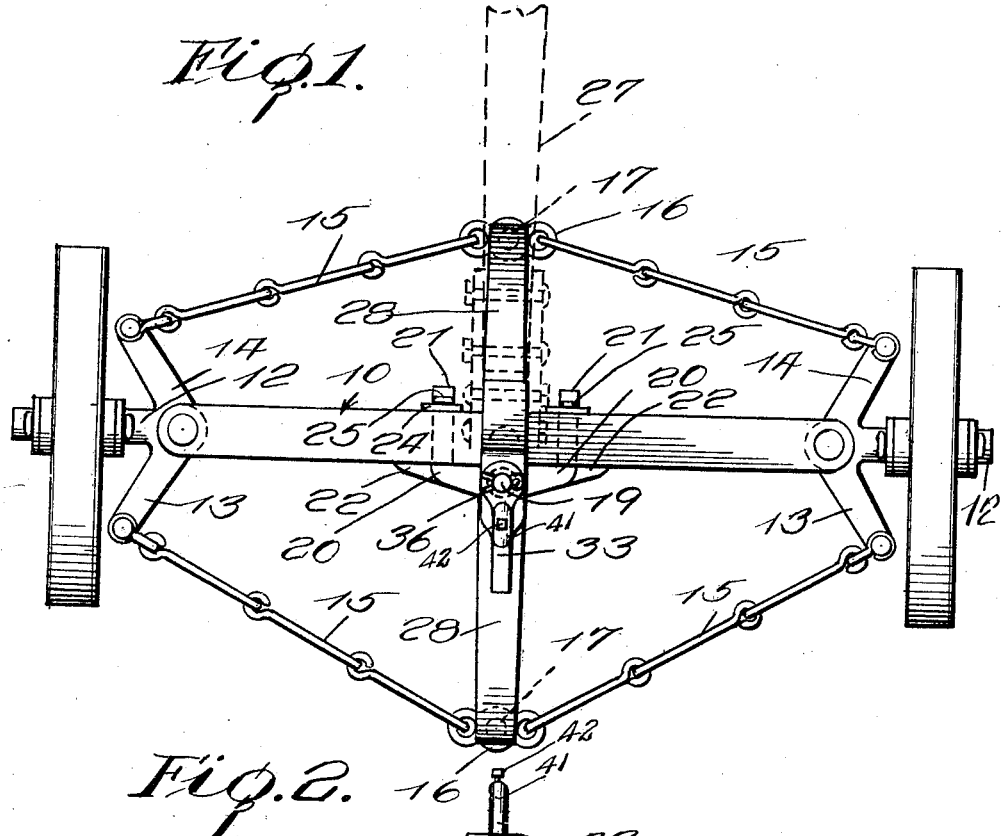
Figure 1 is a plan view of hitch mechanism constructed in accordance with my invention, the implement being indicated in dotted lines.
Figure 2:
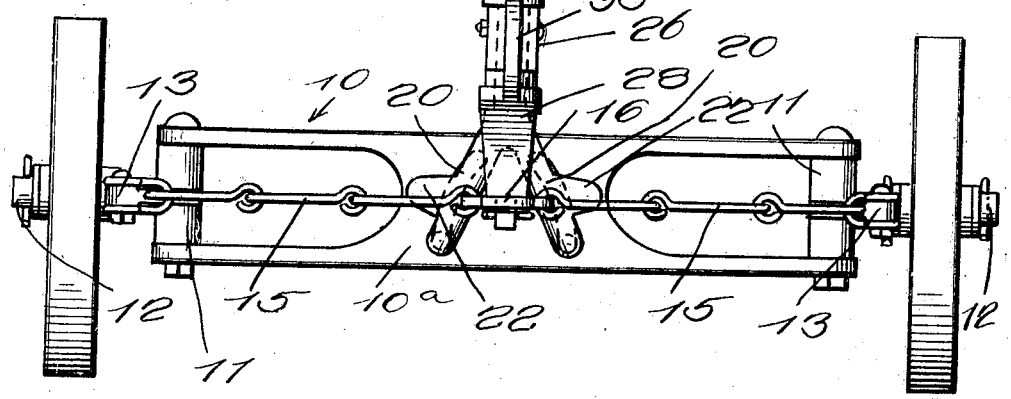
Figure 2 is a front elevation thereof.

Referring now more particularly to the drawings, the numeral 10 designates a wheel truck including an axle $10^a$ of considerable depth and having the ends thereof forked to receive the spindle mounting 11 of spindles 12. Each spindle mounting 11 in addition to the spindles 12 thereof bears a forwardly projecting arm 13 and a rearwardly projecting arm 14. The forwardly projecting arms 13 are connected by a flexible element 15, as are the rearwardly projecting arms 14, each flexible element 15 being provided centrally thereof with a flat plate 16 having a central aperture 17 for a purpose presently to appear. At opposite sides of its center the axle has formed therethrough oppositely directed upwardly converging arcuately curved slots 18, each slot 18 being curved with the center of the lower end of the other slot as a center. The faces of the axle at the slotted portion thereof are smooth and flat for a purpose presently to appear.

The numeral 19 designates a vertical support formed at its lower end with a fork dividing diverging arms 20. The lower ends of the arms 20 are provided with parallel right angular projections 21 and the arms immediately above these projections are provided with lugs 22 having their working faces disposed in a common plane, which plane is the plane of the faces of the arms 20 from which the angular extensions 21 project. At the juncture of the yoke with the support 19 proper a shoulder 23 is formed, the purpose of which will presently appear. The angular projections 21 are spaced apart a distance equal to the distance between the lower ends of the slots 18 and are directed therethrough, being held in position within the slots by means of washers 24 held in position by suitable retaining elements 25. The washers 24 abut one face of the axle while the lugs 22 have their faces abutting the opposite face of the axle and accordingly the support 19 is vertically disposed when the axle is horizontal and the angular projections 21 are arranged at the bottoms of the slots. It is pointed out that with one of the projections at the bottom of the slot the other projection is free to move through the arcuate slot in which it is arranged to permit an alteration of the angle between the support 19 and the axle $10^a$. To the support 19 intermediate and spaced from the shoulder 23 and the extreme upper end thereof is a saddle 26 adapted to be secured to the beam 27 of an agricultural implement, the saddle 26 being held against rotative movement with relation to the support and being rigidly fixed to the beam 27. It will be seen that if the implement to which the beam 27 is secured assumes an angle to the horizontal the support 19 may shift to accommodate this change of angle.

The numeral 28 designates a reach arm which is directed longitudinally of the device or transversely as respects the axle 10ᵃ. This reach arm is bow-shaped and has the bight portion 29 thereof formed with an opening 30 receiving the support 19 but of such size that the arm rests upon the shoulder 23 at the junction of the fork and support. The ends of the reach arm are provided with vertically directed pivot members 31 arranged in the same general horizontal plane as the angular projections 21 when the reach arm is in position upon the support. These pivot members are directed through the openings 17 of the plate 16 and are held against disengagement therefrom, as indicated at 32. It will be obvious that upon rotation of the reach arm upon the support 19 a pull will be exerted through the flexible elements 15 upon a forwardly directed arm 13 of one of the spindle mountings 11 and upon the arm 14 of the other of the spindle mountings, causing these spindle mountings to rotate about the pivots thereof and shift the wheels W in the same direction and at the same time.

The numeral 33 designates a clevis which is in the form of a reclining U, one arm of the U being provided with an opening 34 for the reception of the support 19 below the saddle 26 and the other arm being provided with a bearing 25 engaging the support 19 above the saddle. About the support a securing element 36 is directed through the support 19 to prevent vertical movement of the clevis. The lower arm of the clevis is secured to the bowed reach arm 28 to be held against movement with relation thereto. The bight portion of the clevis is provided with a plurality of spaced openings 37 for the interchangeable reception of the securing element of a coupling yoke 38, which yoke is of sufficient depth to permit a considerable pivotal movement thereof with the securing element as a center and is provided with a forwardly extending portion 39 for the reception of a coupling member or tongue. When used for a tongue a second extension 40 is brought into play for connecting a doubletree thereto. The upper arm of the clevis preferably is provided with an opening 41 through which a steering bar may be directed and held in position by a set screw 42, this steering bar to be employed for steering the device manually.

It is pointed out that since the clevis is rigidly secured to the reach arm 28 any turning movement of the clevis will be imparted to the reach arm and through this reach arm to the flexible element 15, thus turning the wheels as hereinbefore described. The connection of the draft attaching yoke 38 will permit a considerable variation in the longitudinal horizontal angles of the draft and drawn implement as occurs when crossing a gully or the like and the connection between the support 19 and the axle will permit of a considerable deviation in transverse horizontal angles between the drawn implement and the wheel truck. At the same time a structure is provided permitting a turning movement at very sharp angles.

It is further pointed out that the slotted engagement of the support with the axle is of great assistance during such turning movements, permitting a slight oscillation of the support which would relieve strains otherwise placed thereon during such turning movement. Since the structure hereinbefore set forth is capable of a considerable range of change and modification without in any manner departing from the spirit of my invention I accordingly do not limit myself to such specific structure as hereinbefore set forth except as hereinafter claimed.

I claim:—

1. In a hitch of the type described, an axle, spindle supports mounted at opposite ends of the axle and provided in addition to the usual spindles with forwardly and rearwardly extending arms, a flexible connection between corresponding arms of the spindles, a vertical support mounted for rocking movement upon the axle at the center thereof, a reach arm rotatably mounted upon said support, and a connection between the ends of the reach arm and said flexible elements at the approximate centers thereof, said connection of the reach arm with the flexible elements being in approximately the same plane and in alignment with the pivotal mounting of the vertical support.

2. In a hitch of the type described, an axle, spindle supports mounted at opposite ends of the axle and provided in addition to the usual spindles with forwardly and rearwardly extending arms, flexible connections between corresponding arms of the spindles, a vertical support mounted for rocking movement upon the axle at the center thereof, a reach arm rotatably mounted upon said support, a connection between the ends of the reach arm and said flexible elements at the approximate centers thereof, and a clevis rotatably mounted upon said support and to which said reach arm is rigidly secured, said connection of the reach arm with the flexible elements being in approximately the same plane and in alignment with the pivotal mounting of the vertical support.

3. A connection for the axles and beam supports of the wheel trucks of agricultural implements, comprising a vertical support asociated with the axle and upon which the beam support is rotatably mounted, said axle being provided centrally thereof with a pair of arcuately curved upwardly converging slots, the vertical support being provided at its lower end with a fork the arms of which are each provided with an angular extension, said angular extensions being spaced apart a distance equal to the distance between the lower ends of said arcuate slots, said arcuate slots each being curved with the base of the other slot at the center, said extensions being engaged in said slots.

4. A connection for the axles and beam supports of the wheel trucks of agricultural implements, comprising a vertical support associated with the axle and upon which the beam support is rotatably mounted, said axle being provided centrally thereof with a pair of arcuately curved upwardly converging slots, the vertical support being provided at its lower end with a fork the arms of which are each provided with an angular extension, said angular extensions being spaced apart a distance equal to the distance between the lower ends of said arcuate slots, said arcuate slots each being curved with the base of the other slot at the center, said extensions being engaged in said slots, said arms being each provided above the angular extension thereof with a lug one face of which is disposed in the plane of the arms next adjacent the axle.

In testimony whereof I hereunto affix my signature.

GIFFORD DAVIDSON.